Patented Aug. 20, 1929.

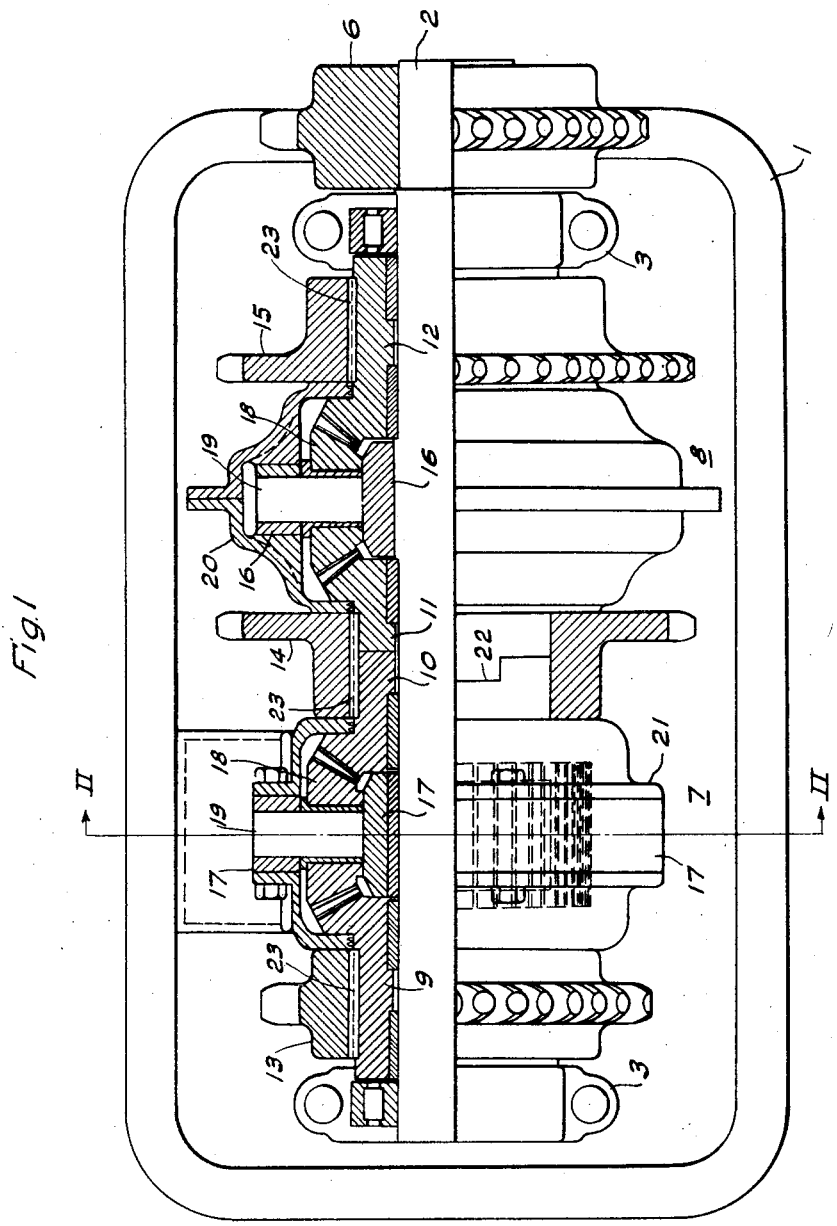

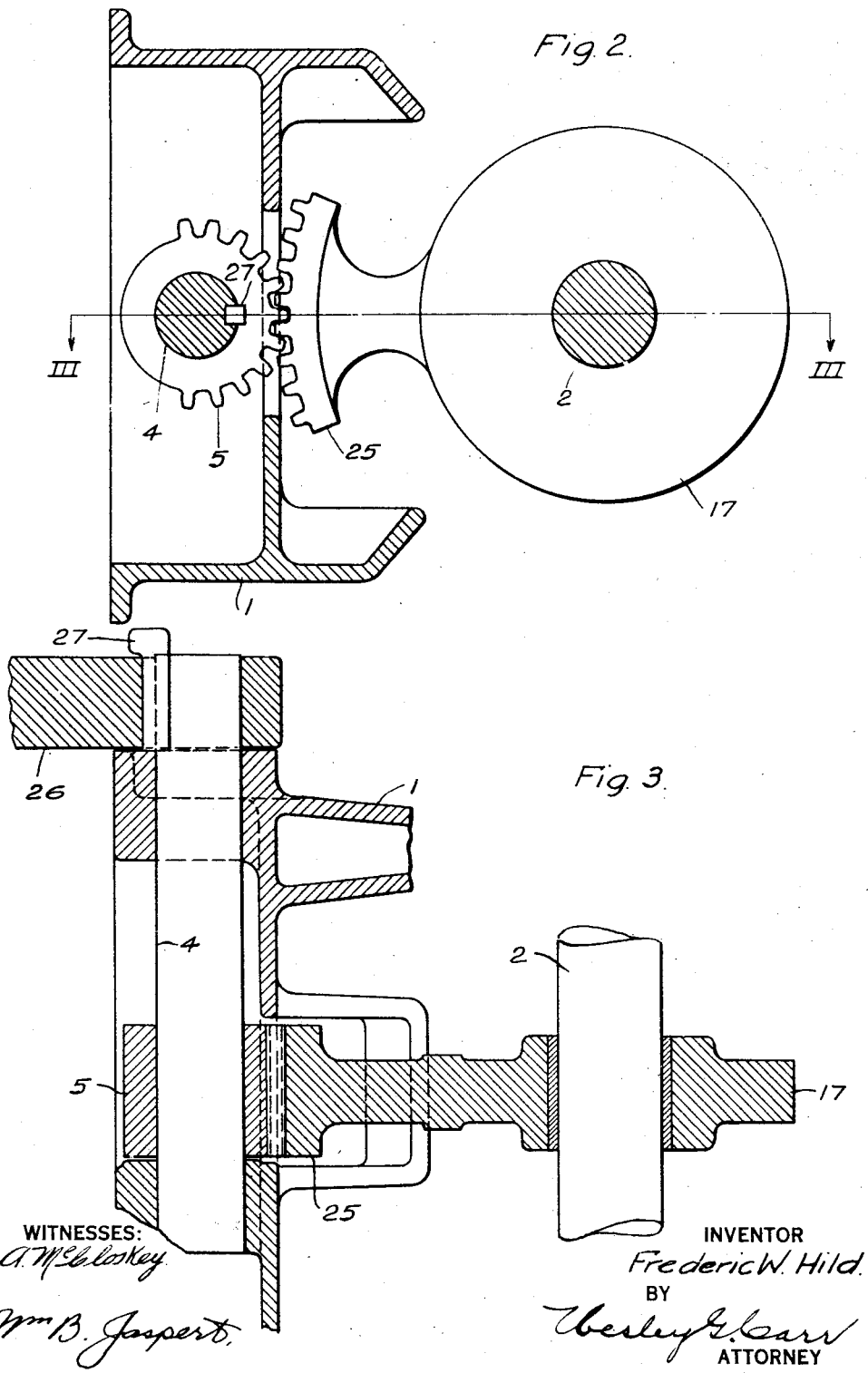

1,725,077

UNITED STATES PATENT OFFICE.

FREDERIC W. HILD, OF LOS ANGELES, CALIFORNIA.

TRANSMISSION DEVICE.

Application filed February 20, 1926. Serial No. 89,612.

My invention relates to transmission systems and more particularly to transmission devices specially adapted for use in connection with earth-boring systems.

It is among the objects of my invention to provide a gear transmission, of simple and mechanically durable construction, that shall be compact and self-contained in a housing member, constituting a gear unit that may be readily mounted in place or removed in its application to earth-boring systems.

Another object of my invention is to provide a transmission gear unit of the above-designated character which shall be designed to occupy a minimum amount of space and which shall comprise a plurality of individual gear elements that are arranged to cooperate in producing the desired operating characteristics of the transmission device.

In my copending application, Serial No. 70,686, filed November 21, 1925, I have described an earth-boring system embodying a double differential gear mechanism that is carried by the line shaft comprising a part of the standard draw works of an earth-boring device.

My present invention is directed to the provision of a transmission unit which shall be self-contained, that is, it shall be independent of the draw works and yet be readily associated therewith, so that it may be utilized as a unit that is readily adapted to be associated with the drilling apparatus, the draw works and the prime movers, through its connecting elements.

In the accompanying drawings constituting a part hereof and in which like reference characters designate like parts, Figure 1 is a top plan view, partially in section and partially in elevation, of a transmission device embodying the principles of my invention, Fig. 2 is a cross-sectional view thereof, taken along the line II—II of Fig. 1, and Fig. 3 is a longitudinal sectional view through a portion of the gear transmission taken along the line III—III of Fig. 2.

Referring to the drawings, the structure therein illustrated comprises a housing member including a base 1, having a shaft 2 journalled for rotation therein by roller bearings 3 and having a torsion shaft 4 carrying a segment gear-wheel 5, which is journalled in the base portion of the housing member 1 with its axis in parallel relation to the shaft 2.

The shaft member 2 carries a sprocket 6, which is secured thereto and is adapted to rotate therewith. A pair of differential gear mechanisms 7 and 8, which comprises a plurality of sun gear-wheels 9, 10, 11 and 12, are rotatably journalled on the shaft 2. Gear-wheels 9 and 12 respectively carry sprockets 13 and 15, while gear-wheels 10 and 11 jointly carry a sprocket 14. The differential gear mechanism 8 embodies a spider 16, the hub portion of which is secured to the shaft 2 to rotate therewith, while the differential mechanism 7 has the hub 17 of its planetary system journalled for rotation on said shaft. The respective planetary pinions 18 are journalled for rotation on radial spider portions 19, which are mounted on the corresponding hub portions and are secured in housings 20 and 21, respectively.

It will be noted that the sun gear-wheels 10 and 11 are mutually interlocked, as shown by the offset line 22 so as to permit independent axial movement of each and also to be in effect a single member to which the sprocket 14 is secured by a key 23. The sprockets 13 and 15 are secured by similar keys to the sun gears 9 and 12.

Thus each of the differential mechanisms 7 and 8 is self contained on the common shaft 2, each takes up its own bearing and gear thrust reactions independently of the other and, at the same time, both are united through a sun-gear-wheel of each.

Referring to Fig. 2, the spider 17 of the differential mechanism 7 is provided with a segment gear-tooth portion 25, which engages the tooth portion of the segment gear 5 that is mounted on the torsion shaft 4. The torsion shaft 4 is also provided with a torque arm 26 that is secured by means of a key 27. When torque is transmitted through the differential 7, the planetary spider 17 tends to turn on the shaft 2 and by reason of the engagement of the toothed portion 25 with the segment gear 5, it tends to turn the torsion shaft 4 and to swing the torque arm 26.

The motion of the torque arm 26 is resisted by its tendency to remain in a substantially vertical position and any departure from this normal position serves to indicate the amount of torque being transmitted or to operate control or other mechanism as set forth in the aforementioned copending application.

The operation of my present device is briefly as follows: As set forth in detail in my above-mentioned copending application, the sprockets 14 and 15 are operatively connected to a pair of prime movers, such as reciprocating engines or electric motors, which are adapted to be actuated in opposite directions of rotation, thus causing the sun gear-wheels 11 and 12, to which they are secured, to also rotate in opposite directions, with the result that the planetary system including pinions 18 will rotate at a speed corresponding to one-half the difference of the speeds of rotation of the respective sun gear-wheels and in the direction of the sun gear-wheel that is rotating at the greater speed.

Since the planetary spider 16 of the differential mechanism 8 is secured to the shaft 2, the latter will rotate with the planetary spider, thereby rotating the sprocket 6, which is connected to the hoist drum of the draw-works when my invention is utilized for earth-boring operations. The rotation of the sprocket 14 will rotate its rigidly associated sun gear-wheel 10 and, therefore, the planetary pinion members 18 of the differential gear mechanism 7, the planetary spider 17 of which is restrained against rotation by the torque arm 26, to which it is connected through the teeth of the gear segment members 25 and 5 of the planetary spider 17 and the torsion shaft 4, respectively.

The resistance to the rotation of the planetary spider of the differential mechanism 7 will effect a transmission of torque from the sun gear-wheel 10 through the pinion members 18 to the sun gear-wheel 9 and thereby rotate the sprocket 13 that is mounted thereon. The sprocket 13 is adapted to be connected to the driving shaft of a rotary drill table, as described in the aforementioned copending application.

It is evident from the foregoing description of my invention that a gear transmission unit made in accordance therewith provides a compact, durable and self-contained transmission device, which may be readily connected in an earth-boring system; and the respective gear elements comprising the transmission are so arranged and designed as to permit ready assembly on a single shaft together with a certain amount of alinement or adjustment in accordance with the stresses to which they are submitted, so as to produce uniform wear on their bearing faces, thus assuring long life of the transmission mechanism.

Although I have described a specific embodiment of my invention, it will be obvious to those skilled in the art that various modifications may be made in the details of construction and in the size and proportion of the several cooperating parts without departing from the principles herein set forth.

I claim as my invention:

1. A transmission device comprising a plurality of shafts journalled for rotation with their axes in parallel alinement, a pair of differential gear mechanisms mounted on one of said shafts, said mechanisms comprising planetary systems, one of which is secured for rotation with said shaft and the other of which is journalled thereon and operatively connected to another of said shafts, the sun gear-wheels of said mechanisms being journalled for rotation on said shaft in cooperative engagement with the respective planetary systems, means for cooperatively engaging one of the sun gear-wheels of each of said differential mechanisms, and means on said second shaft for measuring the torque exerted by the differential mechanism journalled on the first shaft.

2. A transmission mechanism comprising a plurality of differential mechanisms carried by a common shaft, said mechanisms comprising planetary elements and sun gear-wheels, the planetary element of the one being operatively connected to the common shaft, the planetary element of the second differential mechanism being rotatably mounted on said common shaft, means for applying torque to the first differential mechanism, means for transmitting torque from said mechanism to the second differential mechanism, a second shaft operatively connected to the planetary element of the second differential mechanism, and means on the second shaft for measuring the torque exerted upon the second differential mechanism.

3. In a transmission mechanism, in combination, a supporting member, a shaft journalled for rotation in the supporting member, a differential mechanism comprising a planetary system and two sun gear-wheels mounted on the shaft, said planetary system being secured to the shaft, driving members secured to the sun gear-wheels whereby the algebraic sum of their torques is transmitted to the shaft, a second differential mechanism comprising a planetary system and two sun gear-wheels journalled on the shaft, a driven member carried by the shaft, one of the sun gear-wheels of the second differential mechanism being connected to one of the driving members and the other of the sun gear-wheels being connected to the driven member and a torque arm associated with the planetary system of the second differential mechanism for measuring the torque transmitted to the driven member.

In testimony whereof, I have hereunto subscribed my name this 2nd day of February, 1926.

FREDERIC W. HILD.